United States Patent
Lindsay et al.

(10) Patent No.: US 9,647,973 B2
(45) Date of Patent: *May 9, 2017

(54) APPLYING ACTIONS TO ITEM SETS WITHIN A CONSTRAINT

(71) Applicant: Microsoft Corporation, Redmond, WA (US)

(72) Inventors: David Bruce Lindsay, Kirkland, WA (US); Geoffrey M. Clark, Bothell, WA (US); Baskaran Dharmarajan, Palo Alto, CA (US); Ashutosh Tewari, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/490,061

(22) Filed: Sep. 18, 2014

(65) Prior Publication Data

US 2015/0074210 A1      Mar. 12, 2015

Related U.S. Application Data

(63) Continuation of application No. 13/095,110, filed on Apr. 27, 2011, now Pat. No. 8,849,929.

(51) Int. Cl.
*G06F 15/16*      (2006.01)
*H04L 12/58*      (2006.01)
(Continued)

(52) U.S. Cl.
CPC ............ *H04L 51/18* (2013.01); *G06F 9/4843* (2013.01); *G06F 9/5027* (2013.01); *G06F 2209/5013* (2013.01)

(58) Field of Classification Search
CPC ................ G06F 9/4843; G06F 9/5027; G06F 2209/5013; G06F 9/50; G06F 15/16; G06F 9/48
See application file for complete search history.

(56) References Cited

U.S. PATENT DOCUMENTS 6,311,095 B1      10/2001    Brown
6,353,844 B1 *    3/2002     Bitar ..................... G06F 9/4887
                                                       718/102

(Continued)

OTHER PUBLICATIONS

Non-Final Office Action cited in U.S. Appl. No. 13/095,110 dated Apr. 2, 2013, 17 pgs.

(Continued)

*Primary Examiner* — Benjamin M Thieu

(57) ABSTRACT

Items of an item set may be stored by an item server (e.g., mail messages comprising a mailbox stored by a mail server) that supports the application of actions, but only within a constraint (e.g., a maximum duration or computational resources consumed by the action). The application of complex actions to large item sets may exceed the constraint if performed in one request. Moreover, the request may be made by a user interface of a user device, but the user interface may stall while interoperating with the item server to perform the action. Instead, a background process may issue a sequence of requests applying the action to respective batches of items within the constraint. This architecture may enable the user interface to remain responsive to the user while the action is performed, and even to be terminated without jeopardizing the completion of the action upon the item set.

20 Claims, 7 Drawing Sheets

(51) Int. Cl.
*G06F 9/48* (2006.01)
*G06F 9/50* (2006.01)

(56) References Cited

U.S. PATENT DOCUMENTS

| | | | | |
|---|---|---|---|---|
| 7,020,876 | B1* | 3/2006 | Deitz | G05B 19/41865 |
| | | | | 700/1 |
| 7,711,787 | B2* | 5/2010 | Han | H04L 49/10 |
| | | | | 370/389 |
| 7,735,730 | B2 | 6/2010 | Hoyos et al. | |
| 7,765,549 | B1* | 7/2010 | Lauer | 718/101 |
| 7,849,188 | B2 | 12/2010 | Yu | |
| 7,908,358 | B1* | 3/2011 | Prasad | G06F 11/3476 |
| | | | | 709/224 |
| 8,209,691 | B1* | 6/2012 | Lauer | 718/101 |
| 2003/0028587 | A1 | 2/2003 | Driscoll et al. | |
| 2005/0165802 | A1* | 7/2005 | Sethi | G06F 17/3056 |
| 2005/0198636 | A1* | 9/2005 | Barsness | G06F 9/4881 |
| | | | | 718/100 |
| 2006/0048155 | A1* | 3/2006 | Wu et al. | 718/101 |
| 2006/0136930 | A1 | 6/2006 | Koler et al. | |
| 2007/0094336 | A1 | 4/2007 | Pearson | |
| 2007/0234363 | A1* | 10/2007 | Ferrandiz | 718/101 |
| 2008/0256541 | A1* | 10/2008 | Rai | G06F 9/4843 |
| | | | | 718/101 |
| 2010/0010967 | A1* | 1/2010 | Muller | 707/3 |
| 2010/0174823 | A1 | 7/2010 | Huang | |
| 2011/0016354 | A1* | 1/2011 | Douros | G06F 11/1438 |
| | | | | 714/16 |
| 2011/0138397 | A1* | 6/2011 | Kikuchi | G06F 11/3476 |
| | | | | 718/106 |
| 2011/0154073 | A1* | 6/2011 | Wang | G06F 9/505 |
| | | | | 713/320 |
| 2012/0144170 | A1* | 6/2012 | Singh | 712/223 |

OTHER PUBLICATIONS

Reply Non-Final Office Action cited in U.S. Appl. No. 13/095,110 dated Jul. 2, 2013, 14 pgs.
Final Office Action cited in U.S. Appl. No. 13/095,110 dated Aug. 27, 2013, 24 pgs.
Reply Final Office Action cited in U.S. Appl. No. 13/095,110 dated Nov. 26, 2013, 15 pgs.
Notice of Allowance cited in U.S. Appl. No. 13/095,110 dated May 22, 2014, 12 pgs.
"Sub::Slice", Jan. 3, 2011, reprinted from the Internet at: http://linux.downloadatoz.com/sub-slice, 3 pgs.
"Long-running services and background objects" Jan. 24, 2011, Fjorum Nokia Library, Symbian Software Ltd, reprinted from the Internet at: http://devlib.symbian.slions.net/s3/GUID-8BD6B29C-D905-5D2B-992A-A04AAD9ABBE3.html, 2 pgs.
"Anti-patterns", Jan. 24, 2011, reprinted from the Internet at: http://manual.qooxdoo.org/current/pages/development/antipatterns.html., 3 pgs.
Long-running active object, part 1:, Koolzers.net, Jan. 24, 2011, reprinted from the Internet at: http://www.koolzers.net/en/us/articles/long-running-active-object-part1.aspx, 6 pgs.

* cited by examiner

APPLYING ACTIONS TO ITEM SETS WITHIN A CONSTRAINT

CROSS-REFERENCE TO RELATED APPLICATIONS

The present application is a continuation of and claims priority to U.S. patent application Ser. No. 13/095,110, filed Apr. 27, 2011 and also entitled "Applying Actions to Item Sets Within a Constraint," the entirety of which is incorporated by reference as if fully rewritten herein.

BACKGROUND

Within the field of computing, many scenarios involve an item set comprising a set of items managed by an item server, such as a mailbox comprising a set of mail messages stored by a mail server, a file system comprising a set of files stored by a file server, and a database comprising a set of records stored by a database server. Within such item sets, an action requested by a user or process may be applied that may take a considerable amount of time and/or processing power to complete, particularly if the action is complex and/or the item set is large. However, the item server may be configured to service many processes and/or users, and it may be undesirable to apply the entire operation to the item set as an uninterruptible transaction, because this application may deprive the other processes and/or users of computing resources (e.g., the item set may have to be exclusively locked in order to perform the action, or the bandwidth, memory, or computational capacity of the server may be exhausted while performing the operation). Therefore, many item servers may execute the action under a constraint, such as a maximum amount of time, computational capacity, memory, and/or bandwidth that may be consumed by the action. Actions that exceed this constraint may be suspended or terminated by the item server; or, if the action appears likely to exceed the constraint, the item server may simply refuse to perform the action.

SUMMARY

This Summary is provided to introduce a selection of concepts in a simplified form that are further described below in the Detailed Description. This Summary is not intended to identify key factors or essential features of the claimed subject matter, nor is it intended to be used to limit the scope of the claimed subject matter.

In scenarios involving the application of an action to an item set stored by an item server having a constraint, several techniques may be available. As a first example, the item server, or a device interfacing directly with the server (e.g., a server-side interface layer, such as a webserver configured to interface with the item server and render web pages presenting the results thereof) may be configured in a stateful manner; e.g., the action may be executed periodically on behalf of the user until all of the items of the item set have been processed. However, the application of stateful configurations within a server (including a webserver interfacing with the item server) may be resource-intensive, unduly complex, or an unacceptable design choice. As a second example, a user interface executing on a user device, through which the user requested the action, may issue a series of requests to perform the action on subsets of items within the item set, wherein the request may be applied to any particular subset of items within the constraint of the item server. However, this example may overly tax the user interface, e.g., by suspending the operation and/or responsiveness of the user interface until the action has been applied to all items of the item set. Moreover, the user may choose to terminate the user interface (e.g., if the user is frustrated by the lack of responsiveness of the user interface while issuing the requests to perform the action), thereby terminating the application of the action before application to the item set is complete, thereby leaving only some of the items processed and the item set in a potentially inconsistent state.

Presented herein are techniques for applying a potentially long-running action to the items of an item set stored by a stateless item server having a constraint. In accordance with these techniques, the user may initiate an action to be applied to the item set through a request provided on a device through a user interface (e.g., clicking a button or other control requesting the application of the action). However, instead of configuring the user interface to interoperate with the item server (potentially suspending the operation and/or responsiveness of the user interface), the device may initiate a process, such as a background thread or service. The process selects batches of items within the item set to which the action may be applied within the constraint of the item server, and sends to the item server a sequence of requests to the server to apply the action to respective batches of the item set. For example, the process monitors the progress of the item server while applying the action to the items of a first batch, and, upon the item server completing the application of the action to the first batch, initiates a second request to apply the action to the items of a second batch. The process may also monitor the progress of the server in applying the action to respective batches, and may adjust the batch size accordingly for future batches. The separation of the application of the batching and requests for actions from the user interface may enable the application of a long-running process to a constrained, stateless server, while also permitting the device to render the user interface in a consistent, uninterrupted, and responsive manner. Moreover, the process may provide information about the progress of the action upon the item set to the user interface, which may, e.g., present a progress bar indicating the continuation and/or completion of the application of the action to the item set.

These techniques may be advantageous, e.g., for enabling the process to operate independently of the operation of the user interface, which may remain responsive and consistent, and which the user may interact with and/or terminate without jeopardizing the completion of the action to the items of the item set. Additionally, the process may manage the progress of the application of the action, e.g., by adjusting the batch size in view of the success or failure in applying the action to batches, and/or managing failures in the application of the action (e.g., an instance wherein the application of the action to a batch violates the constraint of the item server). Concurrently, the user interface on the device of the user may continue to operate and respond to the requests of the user, and may even be terminated, without jeopardizing the application of the action to the items of the item set.

To the accomplishment of the foregoing and related ends, the following description and annexed drawings set forth certain illustrative aspects and implementations. These are indicative of but a few of the various ways in which one or more aspects may be employed. Other aspects, advantages, and novel features of the disclosure will become apparent from the following detailed description when considered in conjunction with the annexed drawings.

DETAILED DESCRIPTION

Figure 1:
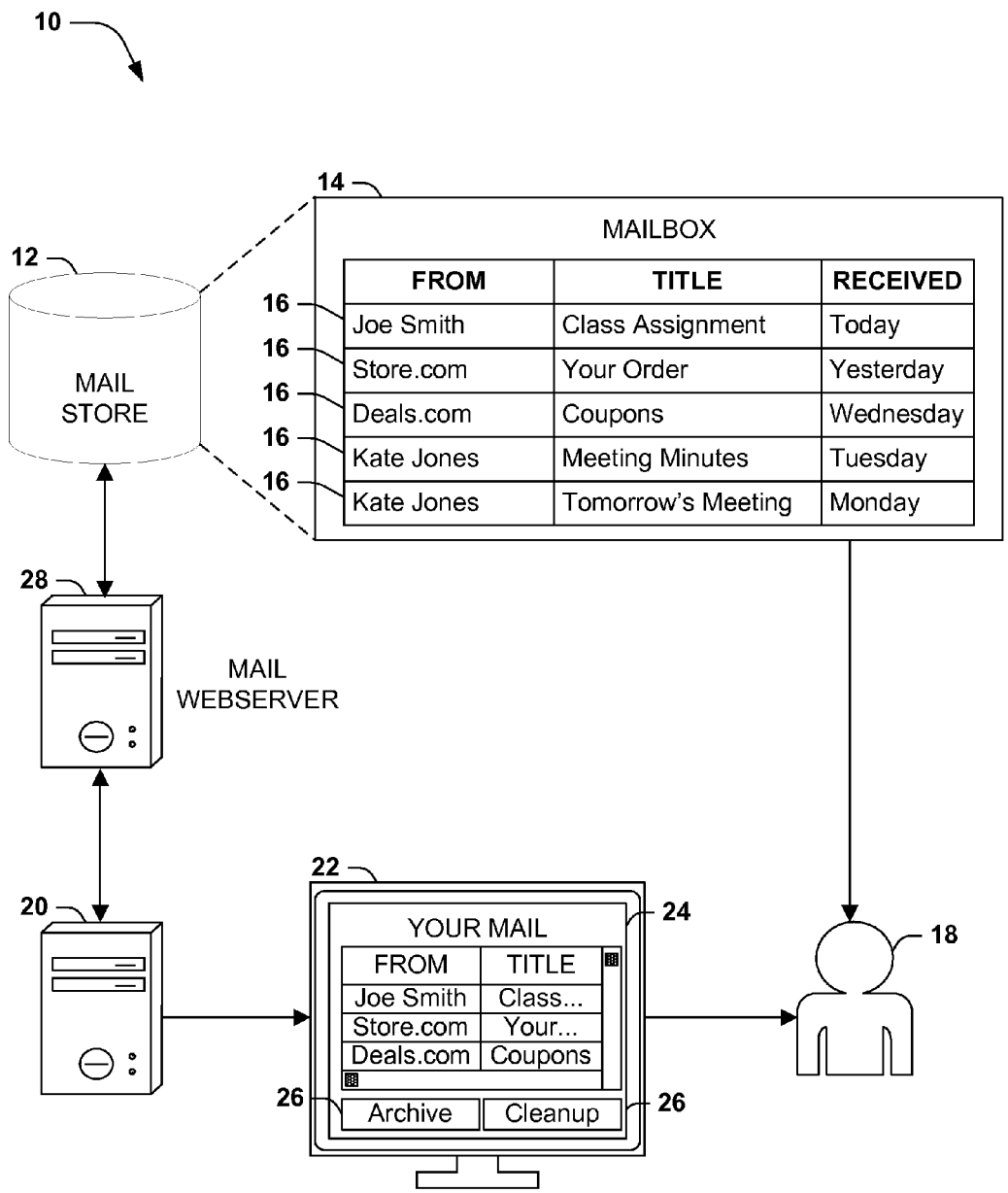
FIG. 1 is an illustration of an exemplary scenario featuring a user interacting with items of an item set stored by an item server.

The claimed subject matter is now described with reference to the drawings, wherein like reference numerals are used to refer to like elements throughout. In the following description, for purposes of explanation, numerous specific details are set forth in order to provide a thorough understanding of the claimed subject matter. It may be evident, however, that the claimed subject matter may be practiced without these specific details. In other instances, structures and devices are shown in block diagram form in order to facilitate describing the claimed subject matter.

Within the field of computing, many scenarios involve an item set, comprising a set of items, stored by an item system. As a first example, a mail server may store a mailbox comprising a set of mail messages to be delivered to various users. As a second example, a file server may store a file system comprising a set of files organized and accessed by various users. As a third example, a database server may store a database comprising a set of records organized in one or more tables to be queried by various users.

In these and other scenarios, an item server may be accessed by one or more users in various ways, such as through various architectures of devices and processes. In particular, many scenarios involve an item server that is not directly utilized by a user (e.g., the applications and processes that consume the data are not accessed on the item server), but rather execute on various other devices. For example, a user may operate a user device, such as a workstation; a portable computer of a computer, notebook, tablet, or palm form factor; or a handheld device such as a smartphone. The user may execute data-driven applications on the user device that interact with the item server. One or more additional layers may also exist between the item server and the user device. As a first example, for an item set that is accessible via a web browser, a webserver may be provided that interacts with the item server on behalf of the user, and presents to the user an interface to the item set through a set of rendered web pages. As a second example, the item server may be reserved for providing high-performance storage of primitive data operations, while complex processes (e.g., evaluating mail messages for spam content, encrypting network traffic for a file server, and applying a complex business logic that defines the rules of the data stored in a database) may be implemented by one or more intermediate servers. Many such architectures and combinations thereof may be devised to satisfy various scenarios.

Additionally, in these and other scenarios, an action may be applied to the items of the item set. The action may be applied to all items of the item set, or may comprise one or more criteria specifying a subset of items matching the criteria to which the action is to be applied. As a first example, messages in a mail system may be downloaded, archived (e.g., relocated to a different folder or storage system), deleted, searched for keywords, or scanned for viruses or other malicious content. As a second example, files in a file system may be downloaded, altered, moved, compressed, or scanned for a particular subset of data. As a third example, records in a database system may be created, read, updated, or deleted using a query specified in a database markup language.

FIG. 1 presents an illustration of an exemplary scenario 10 featuring a mail store 12 configured to store a mailbox 14 comprising messages 16 sent to a user 18. These messages 16 may have various properties (e.g., a sender, a subject, a date of sending, and a message body), and may be stored by the mail store 12 in various ways, e.g., a database table having attributes for respective properties of the messages 16. The user 18 may operate a computer 20 having a display 22, and, through the computer 20, may issue a request to view the messages 16. The mail store 12 may respond by providing some or all of the messages 16 in the mailbox 14 for the user 18, and the computer 20 may generate and present for the user 12 on the display 22 a presentation 24 of the messages 16. The presentation 24 may also include options for applying some controls 26 that may be activated to request the mail store 12 to apply various actions to the messages 16 of the mailbox 14, including an archive option to archive the messages 16 in the inbox of the mailbox 14 and a cleanup option to evaluate the contents of the inbox, filter the messages 16 according to rules or heuristics, and create or update various rules. As additionally illustrated in this exemplary scenario, the computer 20 of the user 18 does not directly interface with the mail store 12, but interfaces with a mail webserver 28 that interacts directly with the mail store 12 on behalf of the user 18 and the computer 20, and that sends responses from the mail store 12 (including the presentation 24 of messages 16) in the form of web pages that may be received by the computer 20 and rendered within a web browser on the display 22.

In these scenarios, the user 18 may request an action to be applied to one or more items of the item set stored by the item server. However, the exemplary scenario 10 of FIG. 1 illustrates some problems that may arise in such scenarios. As a first example, complications may arise in choosing the architecture of the systems that perform the action. For example, it may be undesirable to permit an item server to execute the action, because the item server may be reserved for primitive data operations. Alternatively, an intermediate server that interfaces with the item server (e.g., a business logic server or a webserver) may perform actions on behalf of respective users 18. However, such execution may divert resources from the performance of servers within the specified role (e.g., executing the action on a webserver may diminish the capacity of the webserver to provide web pages for other users 18). Additionally, the execution of a long-running action on a server provided by a service (e.g., a mail service) may exhibit scalability problems; e.g., the number of requests to perform such long-running actions may scale up proportionally with the number of users 18 of the service, thereby significantly increasing the costs of providing the service and the number of devices involved therein.

Instead, it may be desirable to execute a significant portion of the action on the computer 20 (or other device) of the user 18. For example, while applying an action involving a complex evaluation of items (e.g., a cleanup of a mailbox that involves evaluating the messages provided therein in order to identify and generate rules therefrom), it may be desirable to utilize the computer 20 of the user 18 to perform the evaluation rather than the item server or an intermediate server provided by the service. However, this solution may also be undesirable; e.g., the performance of the computer 20 of the user 18 may be reduced and/or overly utilized, resulting in apparently diminished performance of the service to the user 18.

As a second exemplary problem with such scenarios, many such actions may consume a significant amount of computing resources of the item server, such as computational capacity, memory or storage capacity, or network capacity, and/or may simply take a long time to perform. Moreover, some actions 18 may involve exclusively locking a resource, and while the resource is locked during a long-running action, the item server may be unable to perform other operations involving the locked resource. While it may be desirable to permit the user 18 to request these actions, the item server may exhibit reduced performance for other users and processes while performing the resource-intensive action on behalf of the user 18. For example, in the exemplary scenario 10 of FIG. 1, while the mail server 12 is performing a mail archive action for the user 18, the mail server 12 may exhibit reduced performance for mail from other users 18, such as slow response times or the failure of some actions to complete within a designate time frame. Additionally, users 18 may maliciously or unintentionally cause a protracted and perhaps unending consumption of such resources (e.g., a denial-of-service attack), thereby reducing or eliminating the services provided by the item server to other users 18 and processes for an extended period of time. This problem is exacerbated by the unpredictability in many instances of how long an action may take to complete, or how many computing resources may be consumed during the application of the action (e.g., according to the "halting problem," many operations may not be amenable to evaluation as to the amount of time involved in completing the operation, including a determination of whether or not the operation may terminate or may be interminable).

In order to reduce the problems associated with long-running operations, many item servers are implemented with a constraint that limits the amount of computational resources a particular action may consume. As a first example, the constraint may comprise a computational capacity constraint; e.g., an action may be permitted to utilize only a particular amount of processing power of the item server, such as a small time slice in a preemptive multitasking environment. As a second example, the constraint may limit the maximum amount of memory capacity, storage capacity, and/or network capacity an action may utilize, and may restrict, suspend, or simply terminate an action that exceeds this amount. As a third example, the constraint may comprise a time limit, e.g., a maximum amount of time that an action is permitted to execute before being terminated by the item server. Through the implementation of one or more constraints on requested actions, an item server may permit users 18 to request actions without exposing the vulnerability for misuse or failure caused by unconstrained actions.

Figure 2:
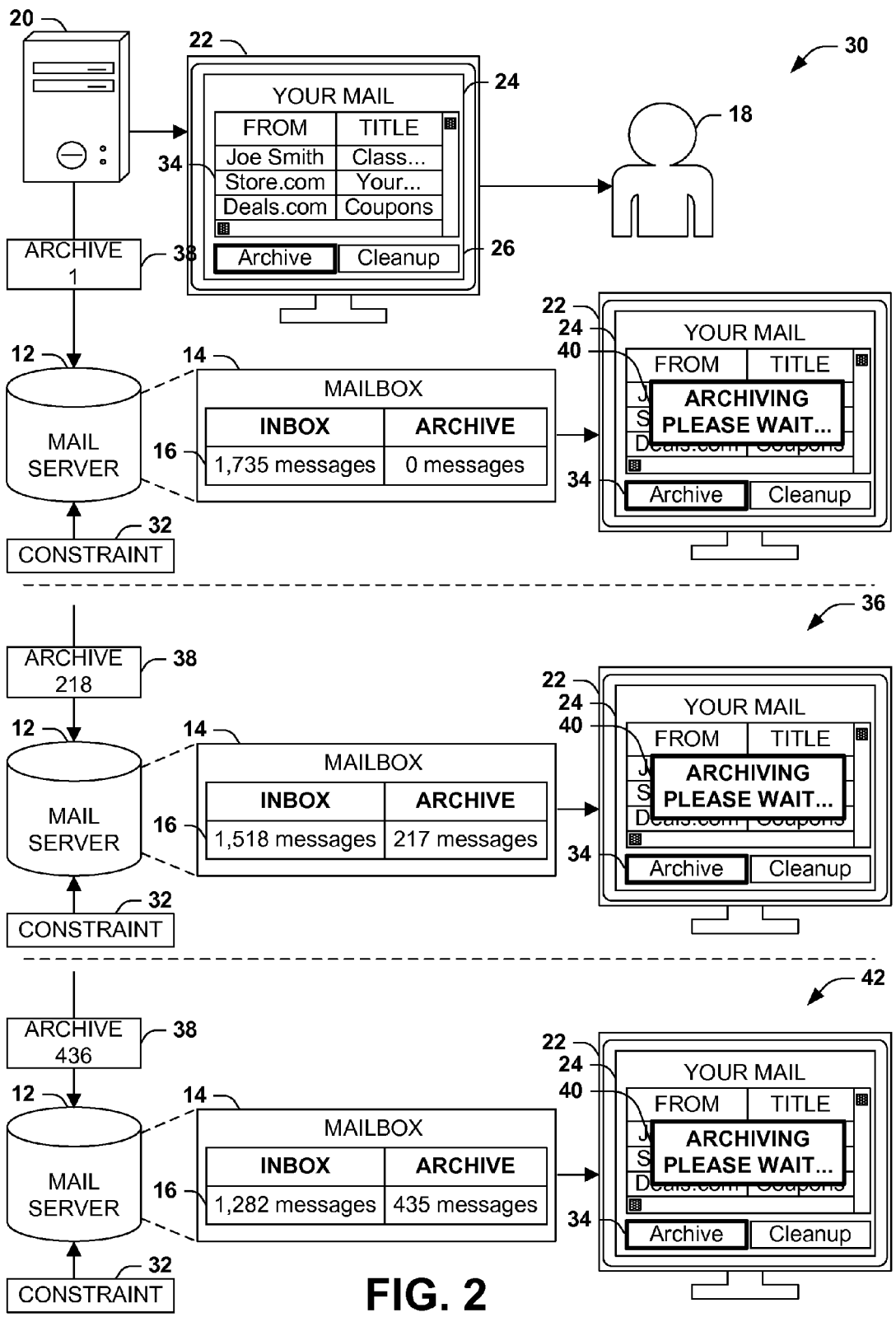
FIG. 2 is an illustration of an exemplary scenario featuring an application of an action requested by a user to items of an item set stored by an item server.

FIG. 2 presents an illustration of an exemplary scenario featuring an application of an action to the messages 16 of a mailbox 14 stored by a mail server 12. The execution of actions on the mail server 12 is restricted by a constraint, e.g., a maximum amount of time that may be involved in the execution of an action before it is terminated. Accordingly, in this exemplary scenario, the action is managed by the computer 20 of the user 18, which issues to the mail server 12 (e.g., through a mail webserver 28 or another intermediate server) a series of commands that apply the action to respective messages 16. For example, at a first time point 30, a user 18 may view a presentation 24 of the mailbox 14 on a display 22 connected to a computer 20, and, among the controls 26 included in the presentation 24 to apply various actions to the messages 16 of the mailbox 14, may select an action 34 to be performed (e.g., an archiving operation requesting a relocation of all messages 16 in the mailbox 14 to a storage archive). For example, the computer 20 may perform this action 34 by issuing a series of commands to the item server 12 to perform the action 34 on individual messages 16 of the mailbox 14 (e.g., "archive message 1 . . . archive message 2 . . . archive message 3 . . . ") The application of the action 34 to individual messages 16 may satisfy the constraint 32, and may also allocate to the computer 20 a significant amount of the processing involved in the action 34 (e.g., managing the progress of the action 34 and the identification of messages 16 to which the action 34 is to be applied). However, in the exemplary scenario of FIG. 2, the action 34 is performed within the presentation 24 of the mailbox 14 generated by the computer 20; e.g., a web browser executing on the computer 20 may render web pages providing access to the mailbox 14, and may also apply any requested actions 34. This architecture results in the significant disadvantage that the presentation 24 and/or the computer 20 of the user 12 may stall while the action 34 is executing. For example, if the action 34 is performed within a web browser of the computer 20, the web browser may be unable to provide other web pages while the action 34 is executed; e.g., the visual indicator of the action 34 may be presented as a modal window that exclusively consumes input from the user 18 until the action 34 is complete. Additionally, navigating away from the web page or closing the web browser may cause the action 34 to terminate, and if the action 34 is not yet complete, the item set (such as the mailbox 14) may be left in an inconsistent state, with the action 34 having been applied only to a subset of messages 16.

As further depicted in FIG. 2, at a first time point 30, the user 18 selects an action 34 to be performed. The action 34 is executed by the presentation 24, e.g., as code within a web page presented by a web browser executed by the computer 20 that issue a series of requests 38 to the mail server 12. However, while the code is executing, the web browser presents a modal dialog within the presentation 24, thereby interfering with the continued operation of the web browser and/or the presentation 24. For example, at a second time point 36, the presentation 24 may include a modal window 40 indicating the in-progress status of the action 34; and at a third time point 36, the presentation 24 may continue to present a modal window 40 indicating the in-progress status of the action 34. The interference with the operation of the computer 20 by the user 18 (e.g., locking up the computer 20, the web browser, or the presentation 24) may frustrated the user 18, and may eventually prompt the user 18 to terminate the presentation 24 (e.g., terminating the web browser or navigating away from the web page). However, terminating the presentation 24 may cause the action 34 to be applied to only some messages 16 of the mailbox 14, thereby leaving the mailbox 14 in an inconsistent state.

Presented herein are techniques for achieving the application of a long-running action 34 to the items of an item set stored by an item server, without violating the constraint of the item server and without overly taxing the item server (e.g., reducing the amount of computation performed on the item server that is involved in the action 34). According to these techniques, a computer 20 or other device operated by a user 18 may receive a request to perform an action 34 on the items of an item set stored by an item server. However, the architecture of the computer 20 or other device separates the process performing the action 34 from a user interface presented to the user 18 through which the action 34 is requested. The process may perform the action 34 by issuing to the item server a sequence of batches of requests, where each batch applies the action 34 to a subset of items that may be processed within the constraint 32 of the item server. As a first example, the item server may specify a batch size, comprising a maximum number of items to which an action 34 may be applied within the constraint 32, and the process implementing these techniques may apportion the item set into batches of items of the batch size, and may issue to the item server a sequence of requests that respectively request the application of the action 34 to a batch of items. As a second example, the embodiment may estimate a batch size of the number of items to which the action 34 may be applied within the constraint of the item server, and/or may monitor the application of the action 34 by the item server in order to adjust the batch size for future batches (e.g., incrementally increasing the batch size if the action 34 is applied faster than anticipated, or decreasing the batch size if the action 34 is applied more slowly than anticipated). Moreover, the process may communicate with the user interface providing the presentation 24 of the item set, e.g., to report the progress of the application of the action 34 to the items of the item set, and the user interface may indicate the performance of the action 34 while also continuing to serve the requests of the user 18. In this manner, the techniques presented herein may facilitate the application of the action 34 to the item set while conserving the resources and respecting the constraint of the item server, and while also freeing the user interface on the device of the user 18 from the performance of the action 34.

Figure 3:
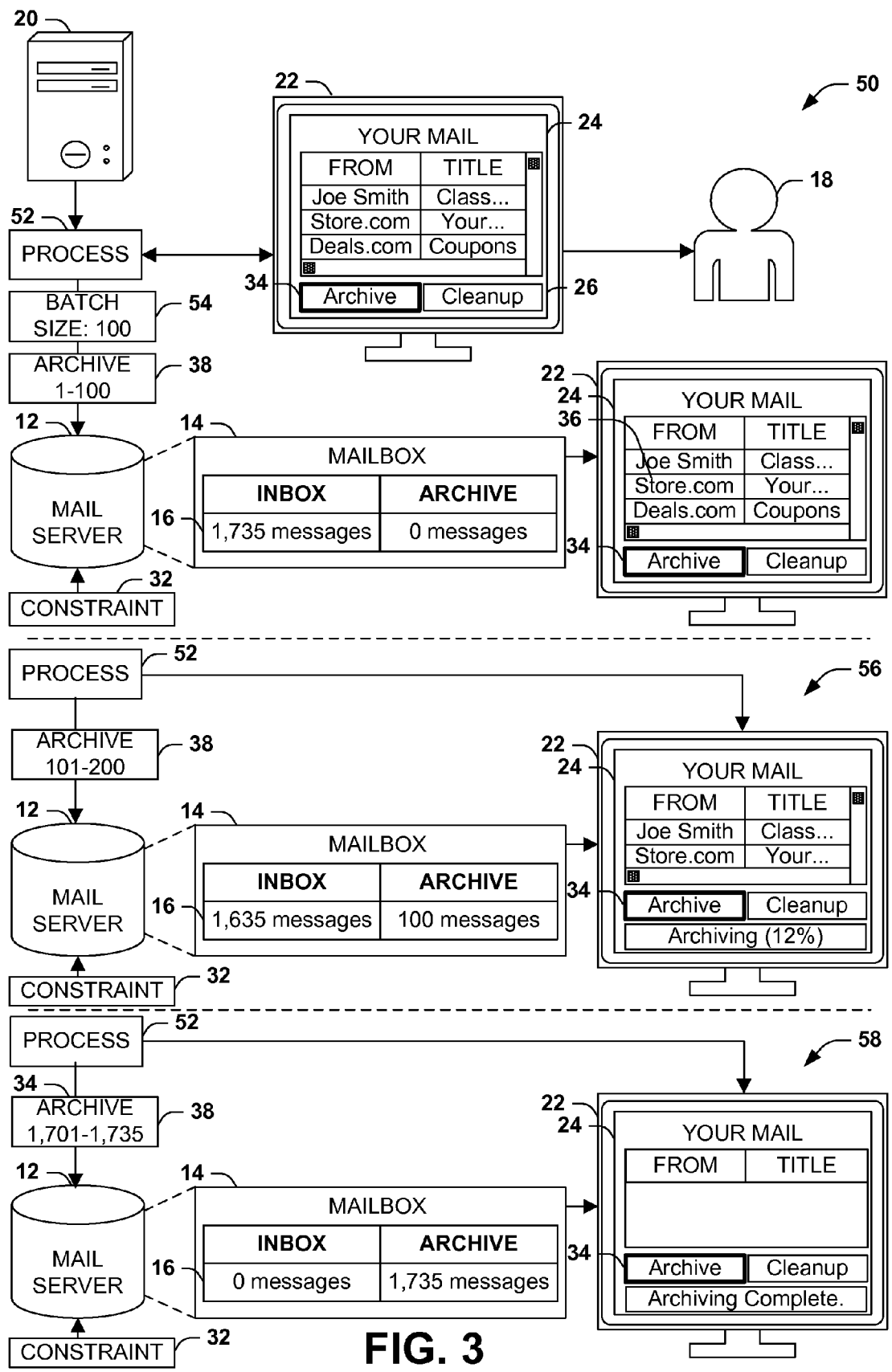
FIG. 3 is an illustration of an exemplary scenario featuring an application of an action requested by a user to items of an item set stored by an item server in accordance with the techniques presented herein.

FIG. 3 presents an illustration of an exemplary scenario featuring the application of an action 34 to the messages 16 of a mailbox 14 stored by a mail server 12 that is limited by a constraint 32. At a first time point 50, a user 18 of a computer 20 may view the mailbox 14 on a display 22, and the mail server 12 (or a webserver communicating with the mail server 12) may present to the computer 20 a presentation 24 of the mailbox 14, such as one or more web pages presenting the message 16 of the mailbox 14. The presentation 24 may also include controls 26 associated with actions 34 that the mail server 12 may perform on the messages 16 of the mailbox 14, and the user 18 may activate a control 26 to request the action 34. However, in contrast with the first time point 30 in the exemplary scenario of FIG. 2, the computer 20 in the exemplary scenario of FIG. 3 utilizes a process 52 (separate from the presentation 24 of the mailbox 14) to communicate with the mail server 12 to perform the action 34. Moreover, the process 52 may request the application of the action 34 to one or more batches of messages 16, each batch specified according to a batch size 54 indicating the number of messages 16 to which the action 34 may be applied within the constraint 32 of the mail server 12. For example, at the first time point 50, the process 52 may select a batch size 54 of one hundred messages 16, and may issue to the mail server 12 a first request 38 to apply the "archive" action 34 to the first one hundred messages of the mailbox 14. At a second time point 56, after the mail server 12 has finished applying the "archive" action 34 to the first batch, the process 52 may issue to the mail server 12 a second request 38 to apply the action 34 to the second batch of one hundred messages in the mailbox 14. Concurrently, the user interface of the presentation 24 rendered for the user 18 on the display 22 may continue to receive and fulfill other requests from the user 18 while the action 34 progresses, and may even receive updates from the process 52 and present a progress indicator within the presentation 34. At a third time point 58, the process 52 may issue a final request 38 concluding the application of the action 34 to the mailbox 34, may notify the user interface (which may present an "archiving complete" message within the presentation 24), and may enter a wait state until the user 18 requests to apply another action 18 to the mailbox 14. In this manner, the process 52 achieves the application of the action 34 to the mailbox 14 while conserving the resources and respecting the constraint 32 of the mail server 12 and also freeing the user interface in the presentation 24 from the performance of the action 18, in accordance with the techniques presented herein.

Figure 4:
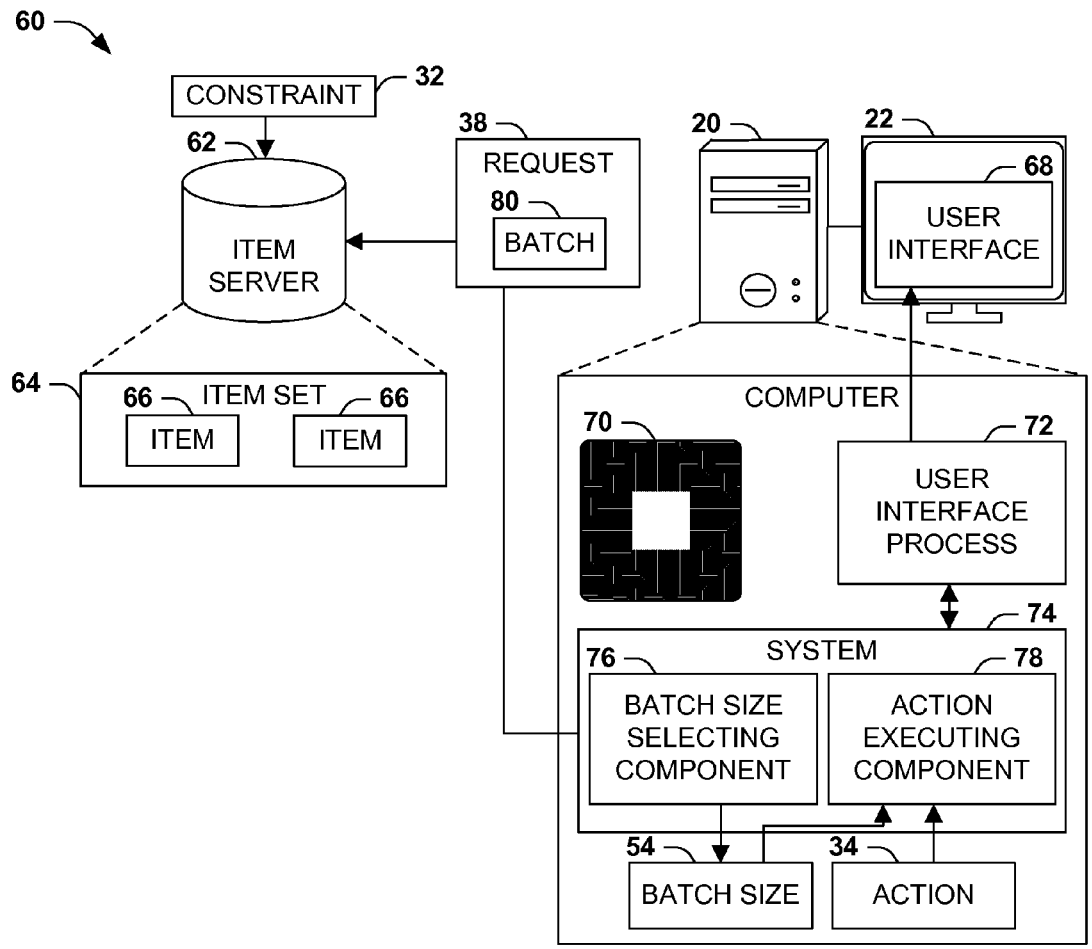
FIG. 4 is a component block diagram illustrating an exemplary system for applying an action to items of an item set stored by a server having a constraint.

FIG. 4 presents an illustration of an exemplary scenario 60 featuring a first embodiment of these techniques, illustrated an exemplary system 74 executing within a computer 20 of a user 18. (The term "computer" in this exemplary scenario 60 includes, e.g., devices such as notebook, tablet, and palmtop computing computers and mobile devices such as smartphones.) In this exemplary scenario 60, an item server 62 stores an item set 64 comprising a set of items 66, and is limited by a constraint 32 specifying a maximum amount of computing resources may be consumed while applying an action 34 to the item set 62. The computer 20 in this exemplary scenario 60 features a processor 70 and a user interface process 72 that is configured to generate a presentation 24 including a user interface 68 presenting the item set 64 to be rendered on a display 22 of the computer 20. In accordance with the techniques presented herein, the computer 20 also includes an exemplary system 74 that is configured to apply an action 34 to the items 66 of the item set 64 stored by the item server 62. The exemplary system 74 may be implemented, e.g., as a set of instructions stored on a memory component of the computer 20 (e.g., a memory circuit, a platter of a hard disk drive, a solid-state storage device, or a magnetic or optical disc) that, when executed by the processor 70, implement a process 52 that causes the computer 20 to implement the techniques presented herein. The exemplary system 74 includes a batch size selecting component 76, which is configured to select a batch size 54 identifying a number of items 66 to which the action 66 may be applied within the constraint 32 of the item server 62. The exemplary system 74 also includes an action executing component 78, which is configured to, for respective batches 80 of items 66 of the item set 64 within the batch size 54, issue a request 38 to the item server 62 to apply the action 34 to the items 66 of the batch 80. In this manner, the exemplary system 74 causes the computer 20 to interact with the item server 62 in order to apply the action 34 to the items 66 of the item set 64 in accordance with the techniques presented herein.

Figure 5:
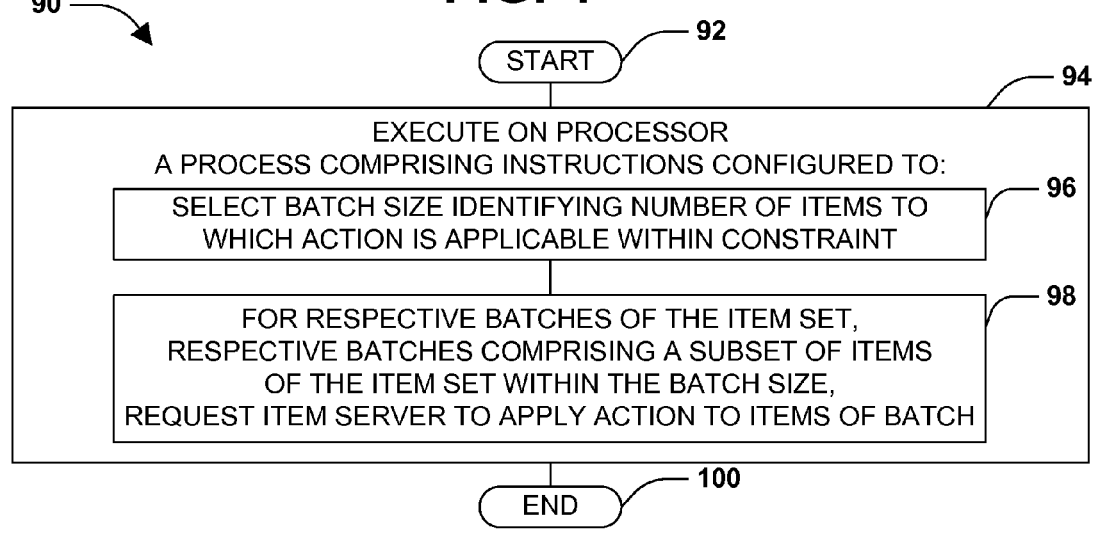
FIG. 5 is a flow chart illustrating an exemplary method of applying an action to items of an item set stored by a server having a constraint.

FIG. 5 presents a second embodiment of these techniques, illustrated as an exemplary method 90 of applying an action 34 to items 66 of an item set 64 stored by an item server 62 having a constraint 32. The exemplary method 90 may be implemented, e.g., as a set of instructions stored on a memory component of the computer 20 (e.g., a memory circuit, a platter of a hard disk drive, a solid-state storage device, or a magnetic or optical disc) that, when executed by the processor 70, implement a process 52 that causes the computer 20 to implement the techniques presented herein. The exemplary method 90 begins at 92 and involves executing 94 on the processor 70 a process 52 that comprising instructions configured to cause the computer 20 to perform the techniques presented herein. In particular, the instructions are configured to select 96 a batch size 54 identifying a number of items 66 to which the action 34 is applicable within the constraint 32 of the item server 62. The instructions are also configured to, for respective batches 80 of the items 66 of the item set 64 comprising a subset of items 66 of the item set 64 within the batch size 54, request 98 the item server 62 to apply the action 34 to the items 66 of the batch 80. In this manner, the exemplary method 90 causes the computer 20 to interact with the item server 62 in order to apply the action 34 to the items 66 of the item set 64, and so ends at 100.

Still another embodiment involves a computer-readable medium comprising processor-executable instructions configured to apply the techniques presented herein. Such computer-readable media may include, e.g., computer-readable storage media involving a tangible device, such as a memory semiconductor (e.g., a semiconductor utilizing static random access memory (SRAM), dynamic random access memory (DRAM), and/or synchronous dynamic random access memory (SDRAM) technologies), a platter of a hard disk drive, a flash memory device, or a magnetic or optical disc (such as a CD-R, DVD-R, or floppy disc), encoding a set of computer-readable instructions that, when executed by a processor of a device, cause the device to implement the techniques presented herein. Such computer-readable media may also include (as a class of technologies that are distinct from computer-readable storage media) various types of communications media, such as a signal that may be propagated through various physical phenomena (e.g., an electromagnetic signal, a sound wave signal, or an optical signal) and in various wired scenarios (e.g., via an Ethernet or fiber optic cable) and/or wireless scenarios (e.g., a wireless local area network (WLAN) such as WiFi, a personal area network (PAN) such as Bluetooth, or a cellular or radio network), and which encodes a set of computer-readable instructions that, when executed by a processor of a device, cause the device to implement the techniques presented herein.

Figure 6:
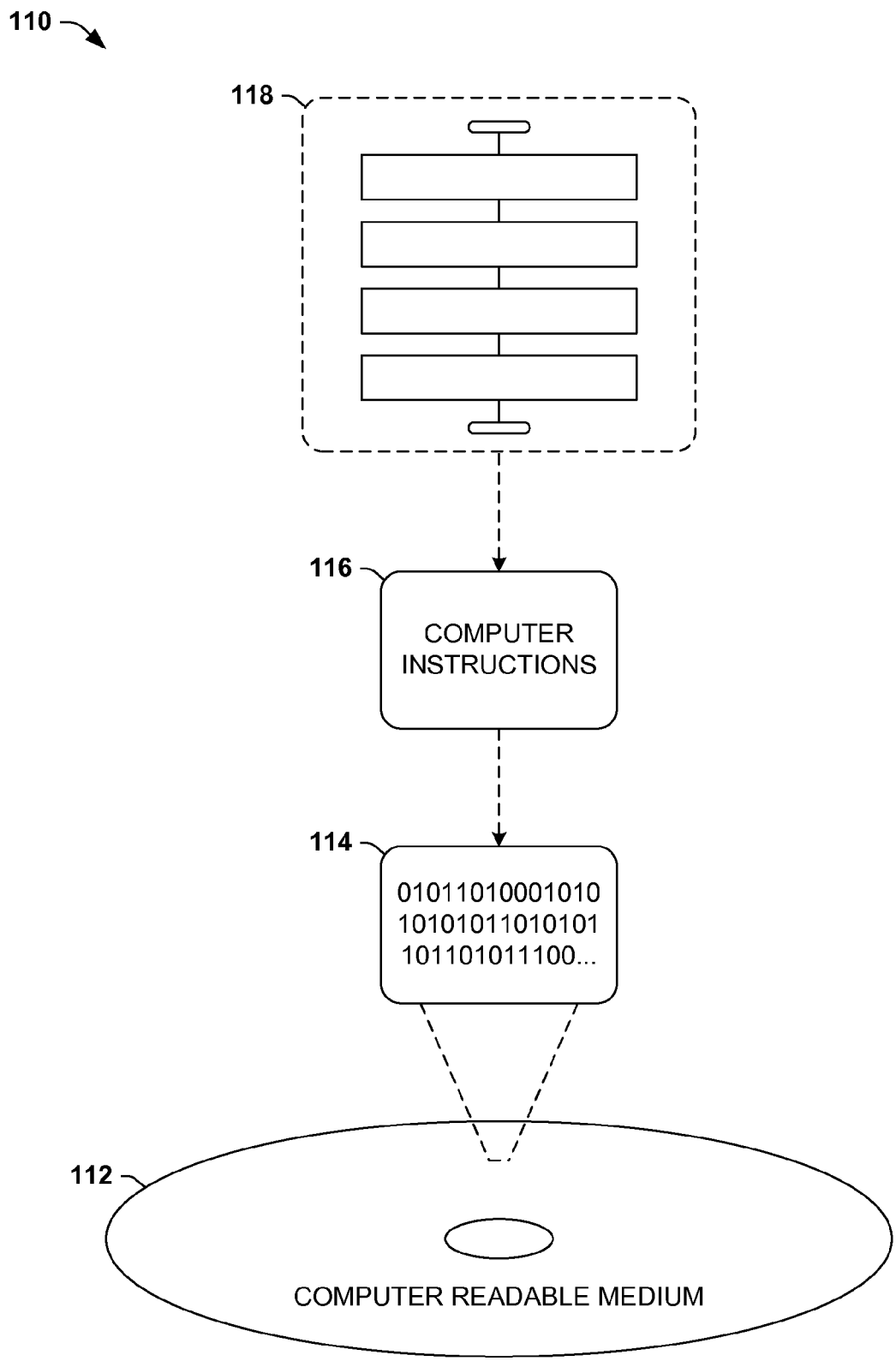
FIG. 6 is an illustration of an exemplary computer-readable medium comprising processor-executable instructions configured to embody one or more of the provisions set forth herein.

An exemplary computer-readable medium that may be devised in these ways is illustrated in FIG. 6, wherein the implementation 110 comprises a computer-readable medium 112 (e.g., a CD-R, DVD-R, or a platter of a hard disk drive), on which is encoded computer-readable data 114. This computer-readable data 114 in turn comprises a set of computer instructions 116 configured to operate according to the principles set forth herein. In one such embodiment, the processor-executable instructions 116 may be configured to implement a system for applying an action to items of an item set stored by a server having a constraint, such as the exemplary system 76 of FIG. 4. In another such embodiment, the processor-executable instructions 116 may be configured to perform a method of applying an action to items of an item set stored by a server having a constraint, such as the exemplary method 90 of FIG. 5. Some embodiments of this computer-readable medium may comprise a nontransitory computer-readable storage medium (e.g., a hard disk drive, an optical disc, or a flash memory device) that is configured to store processor-executable instructions configured in this manner. Many such computer-readable media may be devised by those of ordinary skill in the art that are configured to operate in accordance with the techniques presented herein.

The techniques discussed herein may be devised with variations in many aspects, and some variations may present additional advantages and/or reduce disadvantages with respect to other variations of these and other techniques. Moreover, some variations may be implemented in combination, and some combinations may feature additional advantages and/or reduced disadvantages through synergistic cooperation. The variations may be incorporated in various embodiments (e.g., the exemplary system 76 of FIG. 4 and the exemplary method 90 of FIG. 5) to confer individual and/or synergistic advantages upon such embodiments.

A first aspect that may vary among embodiments of these techniques relates to the scenarios wherein such techniques may be applied. As a first example, these techniques may be applied to many types of items 66 of many types of item sets 64 stored by many types of item servers 62, including messages 16 stored in a mailbox 14 on a mail server 12, files stored in a file system on a file server, and records stored in a database on a database system. As a second example of this first aspect, these techniques may involve many types of actions 34 that may be applied to such items 66 and item sets 64. For example, the actions 34 may be selected from an action set, including an item tagging action specifying at least one tag to be applied to at least one item 66 of the item set 64; an item selecting action configured to select at least one item 66 of the item set 64 (e.g., for application of a second action 34); an item sending action configured to send at least one item 66 of the item set 64 to the item server 62; an item receiving action configured to receive at least one item 66 of the item set 64 from the item server 62; an item updating action configured to update at least one item 66 of the item set 64 stored on the item server 62; an item deleting action configured to delete at least one item 66 of the item set 64 from the item server 62; and an item locating action configured to set a location of at least one item 66 within the item set 64.

As a third example of this first aspect, the techniques may be implemented on many types of devices within the range of architectures exhibited in the scenarios presented herein. As a first such example, an embodiment of these techniques may be implemented on a user device, such as a computer 20 configured to execute a user interface process 72 presenting a user interface 68 to a user 18. In this example, the action 34 may comprise a request initiated by the user 18 within the user interface 68, and the embodiment may be configured to receive the request from the user interface process 72, and, optionally, to communicate updates about the progress of the application of the action 34 to the items 66 of the item set 64 to the user interface process 72 for presentation within the user interface 68. As a second such example, the embodiment may be implemented on a front-end server that is configured to communicate with the item server 62 (e.g., a mail webserver 28 configured to interoperate with a mail server 12 to provide a web-based interface to a mailbox 14 of a user 18). In this example, the action 34 may comprise request 38 initiated by a user 18 upon a user device (e.g., a computer 20 including a smartphone), and the device may be configured to receive the request 38 from the user device. Those of ordinary skill in the art may devise many scenarios wherein the techniques presented herein may be advantageously implemented.

A second aspect that may vary among embodiments of these techniques relates to the selection of a batch size 52 for selecting the batches 80 of items 66. As a first example, the batch size 52 may be specified or suggested by the item server 62, or may be specified by the user 18. As a second example, the batch size 52 may be estimated based on the item set 64, the action 34, and the constraint 32. For example, if the constraint specifies a time (e.g., ten milliseconds) and the action 34 specifies a command that the item server 62 may apply to approximately one hundred items 66 per millisecond, an embodiment of these techniques may utilize a batch size 52 of one thousand items 66 per batch 80, or a reduced number (e.g., eight hundred) in order to provide leeway in case an unexpected delay occurs. As a third example, an embodiment of these techniques may specify the batch size 52 in a flexible manner, e.g., by detecting at least one performance factor from applications of the action 34 to the items 66 of respective batches 80 by the item server 62 (e.g., an amount of time involved in executing a batch 80 of a particular batch size 52), and updating the batch size 52 based on the at least one performance factor. Those of ordinary skill in the art may devise many ways of configuring an embodiment to select a batch size 52 while implementing the techniques presented herein.

A third aspect that may vary among embodiments of these techniques relates to the order in which the items 66 of the item set 64 are organized into batches 80 for application of the action 34. In some scenarios, the order of the items 66 may be fixed, and an embodiment may be unable to order the items 66 in any particular manner. For example, the item server 62 may permit the application of the action 34 to the items 66 only in batches of the predesignated order; or the item server 62 may retain control of the order in which the action 34 is applied. In one such scenario, the item server 62 may only permit the embodiment to specify the ordinal number of the item 66 of the item set 64 from which application of the action 34 is to commence. However, in other scenarios, an embodiment of these techniques may be able to reorder the items 66 of the item set 64 in a particular item order for the grouping of items 66 into batches 80, or may submit each request 38 to process a batch 80 arbitrarily specifying the items 66 comprising the batch 80. In the latter scenarios, an embodiment may be configured to request the items 66 to fit into batches 80 in several ways. For example, the action 34 may be applied to the items 66 of an item set 64 during a presentation 24 of the item set 64 to the user 18. The embodiment may therefore select items 66 for batches 80 in view of the items 66 being presented to the user 18 in the view of the presentation 24. As a first such example, the items 66 currently being presented in the presentation 24 may be grouped into an earlier batch 80 in order to demonstrate responsiveness of the application of the action 34 to the item set 64. As a second such example, the items 66 currently being presented in the presentation 24 may be grouped into a later batch 80, in order to reduce the odds of disrupting the presentation 24 by applying the action 34 to currently viewed items 66 (e.g., by the time that the process 52 applies the action 34 to the batch 80 of items 66, the presentation 24 may have been closed, or may be presenting other items 66 to which the action 34 has already been applied). As a third such example, the presentation 24 may present the items 66 in a particular view order, such as a sort order requested by the user 18 (e.g., sorting the mailbox 14 according to the senders, dates, or subjects of respective messages 16, and the embodiment may request the batching of items 66 according to the view order of the presentation 24. As a fourth example, an embodiment may select batches 80 of items 66 on a "just-in-time" basis as the presentation 24 changes; e.g., upon receiving a request to present a particular subset of items 66, the embodiment may prioritize the application of the action 34 to a batch 80 comprising the as-yet-unprocessed items 60 of the subset, and may endeavor to complete the action 34 upon the batch 80 before generating the presentation 80 thereof. Those of ordinary skill in the art may devise many ways of selecting items 66 for batches 80 while implementing the techniques presented herein.

A fourth aspect that may vary among embodiments of these techniques relates to the application of the action 34 to the batches 80 of items 66 of the item set 64. An action 34 having one or more criteria (e.g., a set of parameters that are to be matched against the items 66 to which the action 34 is to be applied) may be applied to the items 66 of the item set 64 in many ways. A first set of examples of this fourth aspect relate to the manner of performing the identification of matching items 66 and/or processing of the action 34 thereto in a batched manner. A few such examples are illustrated in each of FIGS. 7-9.

Figure 7:
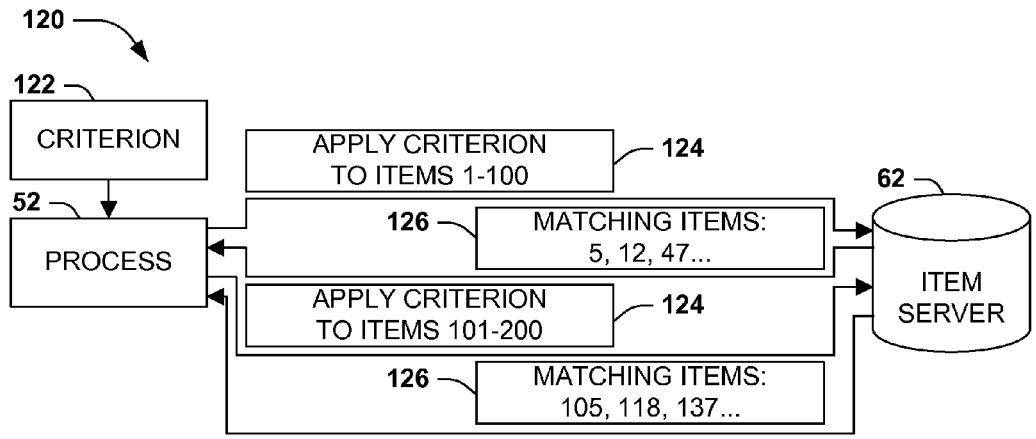
FIG. 7 is an illustration of a first exemplary scenario featuring an application of an action having a criterion in a batched manner to an item set.

FIG. 7 presents an illustration of a first exemplary scenario 120 featuring a first batching technique. In this first exemplary scenario 120, an action 76 comprises one or more criteria 122, and an embodiment of these techniques (e.g., a process 52) may implement the batching as a set of requests 124 to the item server 62 to identify, within particular batches 80 of items 66, the items 66 matching the criteria 122. For example, a first request 124 may be submitted to the item server 124 to identify the items 66 in a first batch 80 that match the criteria 122, and the item server 62 may apply the criteria 124 to the items 66 of the first batch 80 and send a response 126 indicating the matching items 66. The embodiment may gather these responses 126 and then request the application of the action 34 to the matching items 66.

Figure 8:
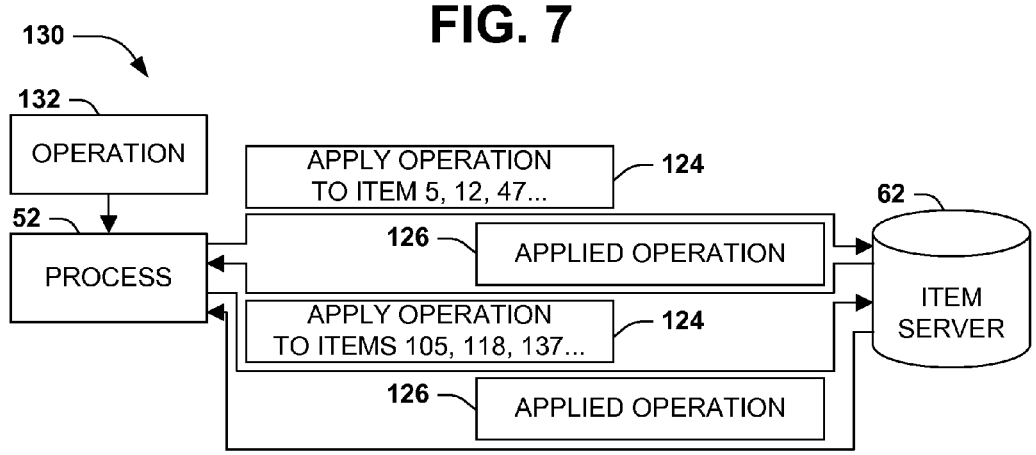
FIG. 8 is an illustration of a second exemplary scenario featuring an application of an action having a criterion in a batched manner to an item set.

FIG. 8 presents an illustration of a second exemplary scenario 130 featuring a first batching technique. In this second exemplary scenario 130, an action 76 comprises one or more operations 132, e.g., alterations to be applied to items 66 of the item set 64, and an embodiment of these techniques (e.g., a process 52) may implement the batching as a set of requests 124 to the item server 62 to apply the operations 132 to the items 66 of respective batches 80 (e.g., items 66 that have been previously identified as matching the criteria 122 of the action 38, and/or to arbitrarily selected batches 80 of items 66 for an action 38 having no criteria 122 and requested to be performed on all items 66 of the item set 64). For example, a first request 124 may be submitted to the item server 124 to apply the operations 132 to the items 66 in a first batch 80, and the item server 62 may apply the criteria 124 to the items 66 of the first batch 80 and send a response 126 indicating the success or failure in the application of the operations 132 to the items 66 of the first batch 80.

Figure 9:
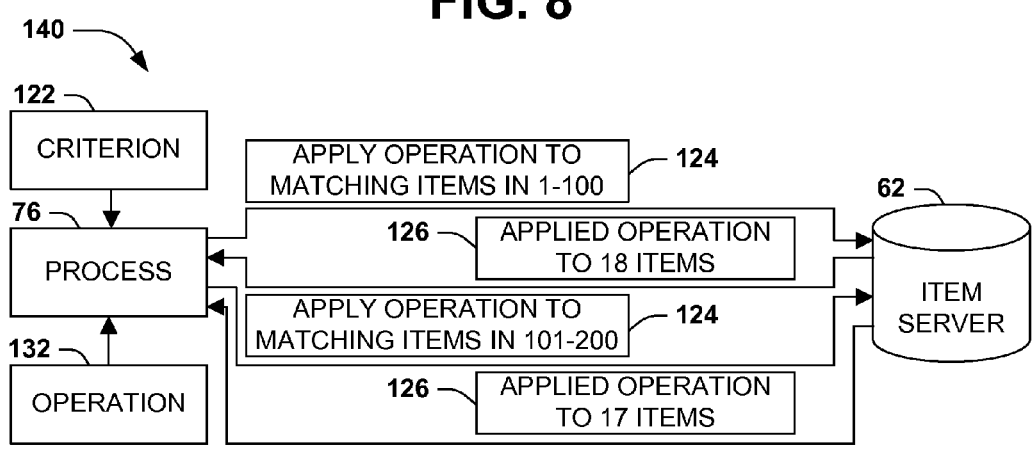
FIG. 9 is an illustration of a third exemplary scenario featuring an application of an action having a criterion in a batched manner to an item set.

FIG. 9 presents an illustration of a third exemplary scenario 140 featuring a first batching technique. In this third exemplary scenario 140, an action 76 comprises one or more criteria 122 and one or more operations 132. An embodiment of these techniques (e.g., a process 52) may implement the batching as a set of requests 124 to the item server 62 both to identify the items 66 within the batch 80 that match the criteria 122, and to apply the operations 132 to the items 66 of the batch 80 matching the criteria 122. For example, a first request 124 may be submitted to the item server 124 requesting a processing of the action 34 to all items 66 of a first batch 80 (e.g., a request to apply the operations 132 of the action 34 to any items 66 of the first batch 80 that match the criteria 122). The item server 62 may identify the items 66 of the first batch 80 matching the criteria 122, apply the criteria 124 to the identified items 66 of the first batch 80, and send a response 126 indicating the number of items 66 to which the action 34 was successfully applied. Many such batching techniques may be identified by those of ordinary skill in the art.

As a second example of this fourth aspect, an embodiment of these techniques may be configured to handle a failure reported by the item server 62 in applying an action 34 to one or more items 66 of a batch 80. This failure may comprise, e.g., an incorrect formulation or specification of the action 34; an inability to process a particular item 66 (e.g., a request to apply an operation 132 to an item 66 that is exclusively locked by another process); or a violation of a constraint 32 while processing the batch 80. Upon receiving a failure response from the item server 62, an embodiment of these techniques may respond in many ways. For example, the embodiment may simply reissue the request 124 to apply the action 38 to the batch 80, thereby requesting the item server 62 to retry the batch 80. For example, a time-based constraint may have been violated due to a delay in the item server 62 that may not recur during a second attempt. Alternatively, the embodiment may remove the items 66 prompting the failure report from the batch 80; may retry the batch 80 at a later time (e.g., when an exclusive lock upon an item 66 that prompted the failure report may have been released); or may simply report the failure message to the user 18.

As a third example of this fourth aspect, an embodiment of these techniques may detect a completion of the application of the action 34 to the items 66 of the item set 64 in various ways. As one such example, the item server 62 may permit the embodiment to specify the ordinal number of the item 66 of the item set 64 from which application of the action 34 is to commence (e.g., indicating where in the item set 64 the application of the action 34 is to begin for a particular iteration), and may respond with an applied item count that indicates the number of items 66 of the item set 64 to which the action 34 was applied. Ordinarily, the applied item count may represent the number of items 66 in the batch 80 (e.g., the batch size 54), but if the number of items 66 in the batch 80 beginning with the specified starting point is fewer than the batch size 54, the applied item count reported by the item server 62 may be smaller. Accordingly, an embodiment of these techniques may, upon receiving from the item server 62 an item applied count indicating a number of items 66 of the item set 64 to which the item server 62 has applied the action 34, detect a completion of the application of the action 34 to the item set 66 upon receiving from the item server 62 an applied item count that is less than the batch size 54.

As a fourth example of this fourth aspect, an embodiment of these techniques may, upon completing the application of an action 34 to an item set 64, create a rule applying the action 34 to subsequently received items 66. For example, upon completing the application of an action 34 to a mailbox 14 specifying that messages 16 from a particular sender are to be moved to a particular folder, the embodiment may request the item server 62 to create a rule indicating that any messages 16 subsequently received from the specified sender are to be moved to the specified folder. Those of ordinary skill in the art may identify many ways of performing the batched application of the action 34 to the item set 64 in accordance with the techniques presented herein.

A fifth aspect that may vary among embodiments of these techniques relates to the interaction of an embodiment with a user interface 68 presented on display 22 of a user device by a user interface process 72. As a first example, where at least one item 66 of the item set 64 is presented to the user 18 within the user interface 68, an embodiment may, upon applying an action 34 to an item 66 presented to the user 18 within the user interface 68, request the user interface process 72 to update the user interface 68, thereby reflecting the action 34 applied to the item 66. As a second example of this fifth aspect, an embodiment of these techniques may communicate the progress of the application of the action 34 to the item set 64, and the user interface 68 may include a progress indicator of the progress in applying the action 34 to the items 66 of the item set 64 (as illustrated, e.g., in the user interface 68 presented in the exemplary scenario 50 of FIG. 3). Alternatively or additionally, upon detecting a completion of the application of the action 34 to the item set 66, an embodiment of these techniques may request the user interface process 72 to update the user interface 68 to indicate the completion of the action 34 (e.g., the "archiving complete" message in the user interface 68 presented in the exemplary scenario 50 of FIG. 3). Those of ordinary skill in the art may devise many ways of configuring an embodiment of these techniques to interact with a user interface process 72 while implementing the techniques presented herein.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

As used in this application, the terms "component," "module," "system", "interface", and the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

Furthermore, the claimed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. Of course, those skilled in the art will recognize many modifications may be made to this configuration without departing from the scope or spirit of the claimed subject matter.

Figure 10:
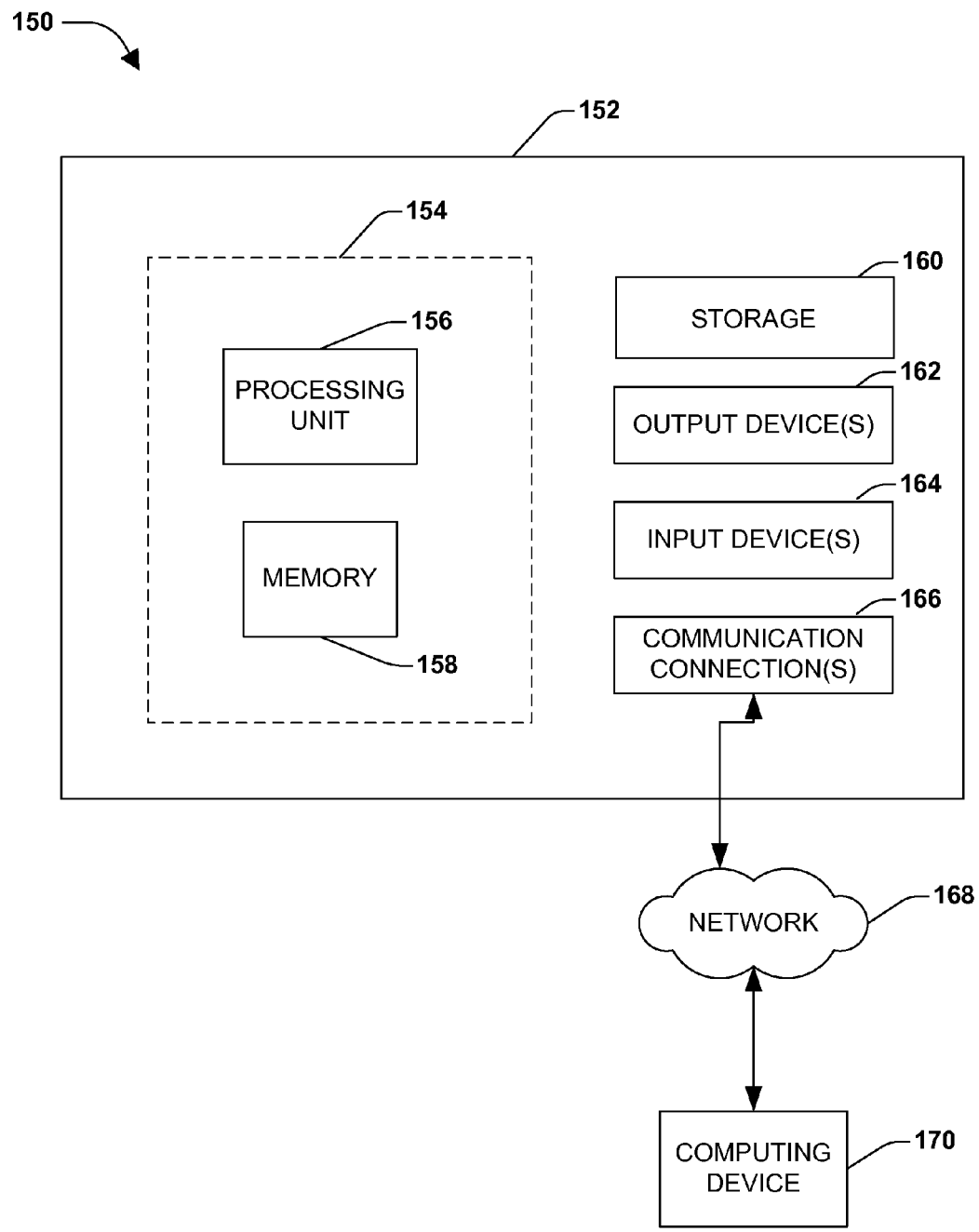
FIG. 10 illustrates an exemplary computing environment wherein one or more of the provisions set forth herein may be implemented.

FIG. 10 and the following discussion provide a brief, general description of a suitable computing environment to implement embodiments of one or more of the provisions set forth herein. The operating environment of FIG. 10 is only one example of a suitable operating environment and is not intended to suggest any limitation as to the scope of use or functionality of the operating environment. Example computing devices include, but are not limited to, personal computers, server computers, hand-held or laptop devices, mobile devices (such as mobile phones, Personal Digital Assistants (PDAs), media players, and the like), multiprocessor systems, consumer electronics, mini computers, mainframe computers, distributed computing environments that include any of the above systems or devices, and the like.

Although not required, embodiments are described in the general context of "computer readable instructions" being executed by one or more computing devices. Computer readable instructions may be distributed via computer readable media (discussed below). Computer readable instructions may be implemented as program modules, such as functions, objects, Application Programming Interfaces (APIs), data structures, and the like, that perform particular tasks or implement particular abstract data types. Typically, the functionality of the computer readable instructions may be combined or distributed as desired in various environments.

FIG. 10 illustrates an example of a system 150 comprising a computing device 152 configured to implement one or more embodiments provided herein. In one configuration, computing device 152 includes at least one processing unit 156 and memory 158. Depending on the exact configuration and type of computing device, memory 158 may be volatile (such as RAM, for example), non-volatile (such as ROM, flash memory, etc., for example) or some combination of the two. This configuration is illustrated in FIG. 10 by dashed line 154.

In other embodiments, device 152 may include additional features and/or functionality. For example, device 152 may also include additional storage (e.g., removable and/or non-removable) including, but not limited to, magnetic storage, optical storage, and the like. Such additional storage is illustrated in FIG. 10 by storage 160. In one embodiment, computer readable instructions to implement one or more embodiments provided herein may be in storage 160. Storage 160 may also store other computer readable instructions to implement an operating system, an application program, and the like. Computer readable instructions may be loaded in memory 158 for execution by processing unit 156, for example.

The term "computer readable media" as used herein includes computer storage media. Computer storage media includes volatile and nonvolatile, removable and non-removable media implemented in any method or technology for storage of information such as computer readable instructions or other data. Memory 158 and storage 160 are examples of computer storage media. Computer storage media includes, but is not limited to, RAM, ROM, EEPROM, flash memory or other memory technology, CD-ROM, Digital Versatile Disks (DVDs) or other optical storage, magnetic cassettes, magnetic tape, magnetic disk storage or other magnetic storage devices, or any other medium which can be used to store the desired information and which can be accessed by device 152. Any such computer storage media may be part of device 152.

Device 152 may also include communication connection(s) 166 that allows device 152 to communicate with other devices. Communication connection(s) 166 may include, but is not limited to, a modem, a Network Interface Card (NIC), an integrated network interface, a radio frequency transmitter/receiver, an infrared port, a USB connection, or other interfaces for connecting computing device 152 to other computing devices. Communication connection(s) 166 may include a wired connection or a wireless connection. Communication connection(s) 166 may transmit and/or receive communication media.

The term "computer readable media" may include communication media. Communication media typically embodies computer readable instructions or other data in a "modulated data signal" such as a carrier wave or other transport mechanism and includes any information delivery media. The term "modulated data signal" may include a signal that has one or more of its characteristics set or changed in such a manner as to encode information in the signal.

Device 152 may include input device(s) 164 such as keyboard, mouse, pen, voice input device, touch input device, infrared cameras, video input devices, and/or any other input device. Output device(s) 162 such as one or more displays, speakers, printers, and/or any other output device may also be included in device 152. Input device(s) 164 and output device(s) 162 may be connected to device 152 via a wired connection, wireless connection, or any combination thereof. In one embodiment, an input device or an output device from another computing device may be used as input device(s) 164 or output device(s) 162 for computing device 152.

Components of computing device 152 may be connected by various interconnects, such as a bus. Such interconnects may include a Peripheral Component Interconnect (PCI), such as PCI Express, a Universal Serial Bus (USB), firewire (IEEE 1394), an optical bus structure, and the like. In another embodiment, components of computing device 152 may be interconnected by a network. For example, memory 158 may be comprised of multiple physical memory units located in different physical locations interconnected by a network.

Those skilled in the art will realize that storage devices utilized to store computer readable instructions may be distributed across a network. For example, a computing device #Z0 accessible via network 168 may store computer readable instructions to implement one or more embodiments provided herein. Computing device 152 may access computing device #Z0 and download a part or all of the computer readable instructions for execution. Alternatively, computing device 152 may download pieces of the computer readable instructions, as needed, or some instructions may be executed at computing device 152 and some at computing device #Z0.

Various operations of embodiments are provided herein. In one embodiment, one or more of the operations described may constitute computer readable instructions stored on one or more computer readable media, which if executed by a computing device, will cause the computing device to perform the operations described. The order in which some or all of the operations are described should not be construed as to imply that these operations are necessarily order dependent. Alternative ordering will be appreciated by one skilled in the art having the benefit of this description. Further, it will be understood that not all operations are necessarily present in each embodiment provided herein.

Moreover, the word "exemplary" is used herein to mean serving as an example, instance, or illustration. Any aspect or design described herein as "exemplary" is not necessarily to be construed as advantageous over other aspects or designs. Rather, use of the word exemplary is intended to present concepts in a concrete fashion. As used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims may generally be construed to mean "one or more" unless specified otherwise or clear from context to be directed to a singular form.

Also, although the disclosure has been shown and described with respect to one or more implementations, equivalent alterations and modifications will occur to others skilled in the art based upon a reading and understanding of this specification and the annexed drawings. The disclosure includes all such modifications and alterations and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such feature may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

What is claimed is:

1. A method of applying an action to items of an item set stored by an item server having a constraint on a device having a processor, the method comprising:
    executing on the processor a process comprising instructions that cause the device to, responsive to receiving a request from a second device to apply the action to the items of the item set:
        for respective batches of the item set, respective batches comprising a subset of items of the item set within a batch size identifying a number of items to which the action is applicable within the constraint:
            request the item server to apply the action to the items of the batch; and
            responsive to receiving a notification from the server of a completion of the batch, notify the second device of the completion of the batch to enable the second device to monitor progress toward completion of the action to the item set; and
        responsive to completion of the action on the items of the item set, request the second device to reflect the completion of the action on the item set.

2. The method of claim 1:
    the device configured to execute a user interface process presenting a user interface to a user;
    the action comprising a request initiated by the user within the user interface; and
    the process configured to receive the request from the user interface process.

3. The method of claim 1:
    the device comprising a front-end server configured to communicate with the item server;
    the action comprising a request initiated by a user upon a user device; and
    the device configured to receive the request from the user device.

4. The method of claim 1:
    the item server comprising a stateless item server; and the action selected from an action set comprising:
        an item tagging action specifying at least one tag to be applied to at least one item of the item set;
        an item selecting action configured to select at least one item of the item set;
        an item sending action configured to send at least one item of the item set to the server;
        an item receiving action configured to receive at least one item of the item set from the item server;
        an item updating action configured to update at least one item of the item set;
        an item deleting action configured to delete at least one item of the item set;
        an item locating action configured to set a location of at least one item within the item set.

5. The method of claim 1, selecting the batch size comprising: estimating a batch size based on the item set, the action, and the constraint.

6. The method of claim 1, selecting the batch size comprising: receiving a batch size specified by the item server.

7. The method of claim 1, the instructions configured to:
    detecting at least one performance factor from applications of the action to the items of respective batches by the item server; and
    updating the batch size based on the at least one performance factor.

8. The method of claim 1, respective batches of items selected according to an item order.

9. The method of claim 8:
    the request initiated by the user within the user interface presenting at least one item of the item set; and
    the item order associated with the items presented in the user interface.

10. The method of claim 1:
    the action specifying at least one criterion of items to which the action is to be applied; and
    requesting the item server to apply the action to the items of the batch comprising: for respective batches selected from the item set, requesting the server to identify items satisfying the at least one criterion.

11. The method of claim 1:
    the action specifying at least one criterion of items to which the action is to be applied; and
    requesting the item server to apply the action to the items of the batch comprising: for respective batches of selected from the item set, requesting the server to apply the action to the items of the batch satisfying the at least one criterion.

12. The method of claim 1:
    the action to be applied to a selected item set of items within the item set; and
    requesting the item server to apply the action to the items of the batch comprising: for respective batches selected from the selected item set, requesting the server to apply the action to the items of the batch.

13. The method of claim 1, the instructions configured to, upon receiving from the item server a failure response indicating a failure to apply the action to a batch, reissue the request to apply the action to the batch.

14. The method of claim 1:
the items of the item set having an item order;
requesting the item server to apply the action to the items of the batch comprising: requesting the item server to apply the action to items of the item set beginning at a specified item order and within the batch size; and
the instructions configured to:
receive from the item server an item applied count indicating a number of items of the item set to which the item server has applied the action; and
detect a completion of an application of the action to the item set upon receiving from the item server an applied item count less than the batch size.

15. The method of claim 1, the instructions configured to, upon completing an application of the action to the item set, create a rule applying the action to subsequently received items of the item set.

16. The method of claim 1:
at least one item of the item set presented to a user within a user interface; and
the instructions configured to, upon applying the action to an item presented to the user within the user interface, update the user interface.

17. The method of claim 1:
at least one item of the item set presented to a user within a user interface; and
the instructions configured to present to the user within the user interface a progress indicator of progress applying the action to the items of the item set.

18. The method of claim 1:
at least one item of the item set presented to a user within a user interface; and
the instructions configured to, upon completing an application of the action to the item set, update the user interface to indicate completing the action.

19. A device that applies an action to items of an item set stored by an item server having a constraint, the device comprising:

a processor; and
a memory storing instructions that, when executed by the processor, provide a system comprising:
a batch selector that partitions the item set into a batch set of batches respectively comprising a subset of items of the item set, respective batches having an item count of items to which the action is applicable within the constraint; and
an action executor that, for respective batches of the item set within the batch size:
requests the item server to apply the action to the items of the batch;
responsive to receiving a notification from the item server of a completion of the batch, transmits a notification of the completion of the batch to enable monitoring of progress toward completion of the action to the item set; and
responsive to completion of the action on the item set, transmit a request to reflect the completion of the action on the item set.

20. A method of applying an action to items of an item set stored by an item server having a constraint on a device having a processor, the method comprising:
executing on the processor a process comprising instructions that cause the device to, responsive to receiving a request from a second device to apply the action to the items of the item set:
partition the item set into a batch set of batches respectively comprising a subset of items of the item set, respective batches having an item count of items to which the action is applicable within the constraint; and
for a first batch of the item set:
request the item server to apply the action to the items of the first batch; and
responsive to receiving a notification from the server of a completion of the application of the action to the items of the first batch:
notify the second device of the completion of the first batch to enable the second device to monitor progress toward completion of the action to the item set; and
request the item server to apply the action to the items of a second batch of the batch set.

* * * * *